United States Patent
Beach et al.

(10) Patent No.: US 10,761,397 B2
(45) Date of Patent: Sep. 1, 2020

(54) VOLTAGE-CONTROLLED OPTICAL DEVICES

(71) Applicant: Massachusetts Institute of Technology, Cambridge, MA (US)

(72) Inventors: Geoffrey S. D. Beach, Winchester, MA (US); Mantao Huang, Harbin (CN)

(73) Assignee: Massachusetts Institute of Technology, Cambridge, MA (US)

( * ) Notice: Subject to any disclaimer, the term of this patent is extended or adjusted under 35 U.S.C. 154(b) by 133 days.

(21) Appl. No.: 16/013,543

(22) Filed: Jun. 20, 2018

(65) Prior Publication Data

US 2018/0364544 A1    Dec. 20, 2018

Related U.S. Application Data

(60) Provisional application No. 62/522,308, filed on Jun. 20, 2017.

(51) Int. Cl.

| | |
|---|---|
| *G02F 1/01* | (2006.01) |
| *G02F 1/23* | (2006.01) |
| *G02F 1/19* | (2019.01) |
| *G02F 1/00* | (2006.01) |
| *G02F 1/03* | (2006.01) |
| *G02F 1/21* | (2006.01) |
| *G02B 6/122* | (2006.01) |
| *G02F 1/15* | (2019.01) |

(Continued)

(52) U.S. Cl.
CPC .............. *G02F 1/23* (2013.01); *G02F 1/0018* (2013.01); *G02F 1/0316* (2013.01); *G02F 1/19* (2013.01);

(Continued)

(58) Field of Classification Search
CPC ..... G02F 1/23; G02F 1/21; G02F 1/19; G02F 1/0018; G02F 1/0316; G02F 1/1508
See application file for complete search history.

(56) References Cited

U.S. PATENT DOCUMENTS

2007/0103612 A1    5/2007   Lumpkin
2008/0245975 A1    10/2008  Miller
(Continued)

FOREIGN PATENT DOCUMENTS

| WO | 2016104385 A1 | 6/2016 | |
|---|---|---|---|
| WO | WO 2016104385 | * 6/2016 | ............... G02F 1/17 |

OTHER PUBLICATIONS

Bauer et al.,"Magnetoionic Control of Interfaciaf Magnetism," Nature Materials 14, 174 (2015). 8 pages.
(Continued)

*Primary Examiner* — Joseph P Martinez
(74) *Attorney, Agent, or Firm* — Smith Baluch LLP

(57) ABSTRACT

Achieving precise, localized reversible control of optical material properties is challenging. Fortunately, electrochemical reactions and proton pumping in a solid-state system provide reversible electrical control of the solid-state system's optical properties. Applying a voltage to a thin solid electrolyte layer, such as $GdO_x$, splits water into $O_2$ and $H^+$ (with charge conservation ensured by electron transfer at the electrodes) at the interface between the solid electrolyte and an electrode. The voltage drives the protons into the solid electrolyte, changing the solid electrolyte's refractive index. Reversing the polarity of the applied voltage drives the protons out of the solid electrolyte, reversing the refractive index change. This reversible electrical control can be used to implement interference color modulation, transmission modulation, and switchable plasmonics. Because the solid electrolyte can be less than 10 nanometers thick, this electrochemical control enables highly localized control of optical properties active plasmonic devices and reconfigurable metamaterials.

23 Claims, 12 Drawing Sheets
(12 of 12 Drawing Sheet(s) Filed in Color)

(51) Int. Cl.
*B82Y 20/00* (2011.01)
*G02B 5/00* (2006.01)

(52) U.S. Cl.
CPC .............. *G02F 1/21* (2013.01); *B82Y 20/00* (2013.01); *G02B 5/008* (2013.01); *G02B 6/1226* (2013.01); *G02F 1/1508* (2013.01); *G02F 2201/34* (2013.01); *G02F 2202/30* (2013.01); *G02F 2202/36* (2013.01); *G02F 2203/10* (2013.01)

(56) References Cited

U.S. PATENT DOCUMENTS

| | | |
|---|---|---|
| 2009/0027758 A1 | 1/2009 | Koshida et al. |
| 2013/0020113 A1 | 1/2013 | Corbea et al. |
| 2014/0340729 A1 | 11/2014 | Tajima et al. |
| 2017/0059957 A1 | 3/2017 | Garcia et al. |
| 2019/0018315 A1 | 1/2019 | Liang et al. |

OTHER PUBLICATIONS

Byers, C. P. et al., "From tunable core-shell nanoparticles to plasmonic drawbridges: Active control of nanoparticle optical properties." Sci. Adv. 1, e1500988-e1500988 (2015). 10 pages.

Comiskey et al., "An electrophoretic ink for all-printed reflective electronic displays," Nature, vol. 394, No. 6690, pp. 253-255, Jul. 1998.

Dickenson et al., "Electronically controlled surface plasmon dispersion and optical transmission through metallic hole arrays using liquid crystal," Nano Lett., vol. 8, No. 1, pp. 281-286, 2008.

Ellenbogen et al., "Chromatic Plasmonic Polarizers for Active Visible Color Filtering and Polarimetry," Nano Lett., vol. 12, No. 2, pp. 1026-1031, 2012.

International Search Report and Written Opinion for PCT/US18/38537 dated Sep. 18, 2018. 14 pages.

Leroux et al., "Active plasmonic devices with anisotropic optical response: A step toward active polarizer," Nano Lett., vol. 9, No. 5, pp. 2144-2148, 2009.

Leroux et al.,"Conducting polymer electrochemical switching as an easy means for designing active plasmonic devices," J. Am. Chem. Soc., vol. 127, No. 46, pp. 16022-16023, 2005.

Ozbay, E., "Plasmonics : Merging Photonics and Electronics at Nanoscale Dimensions," Science, vol. 311, pp. 189-194, Jan. 13, 2006.

Ulanoff, "The future of ultra-low-powered displays is finally in living color." [Online]. Available: http://mashable.com/2016/05/24/color-e. (May 24, 2016).

* cited by examiner

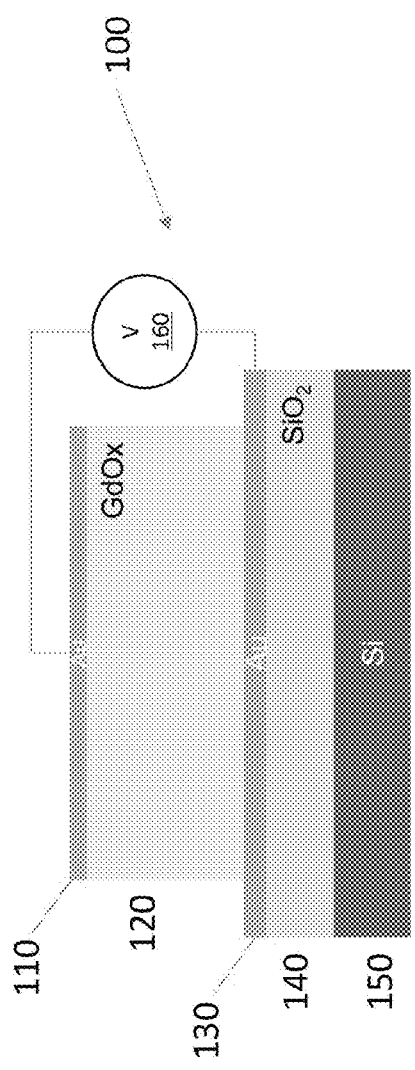
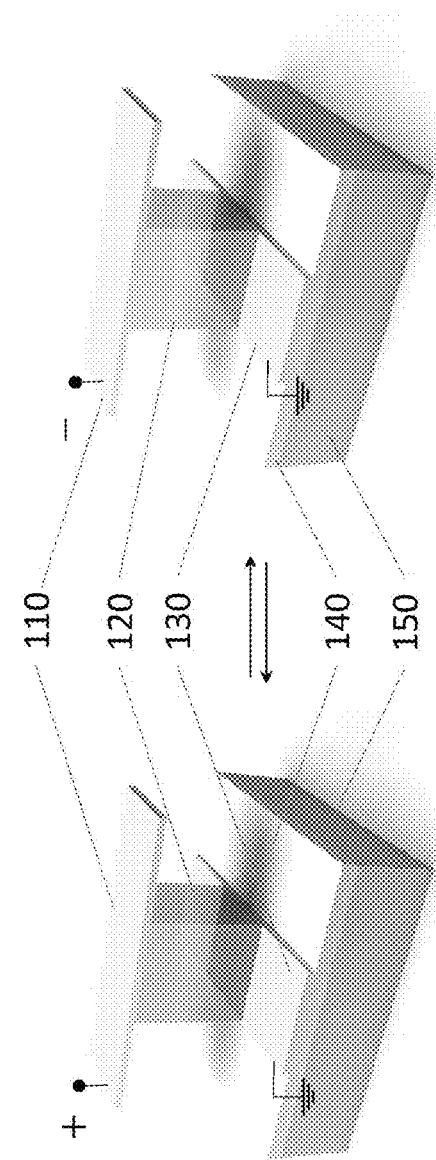
FIG. 1A
FIG. 1B

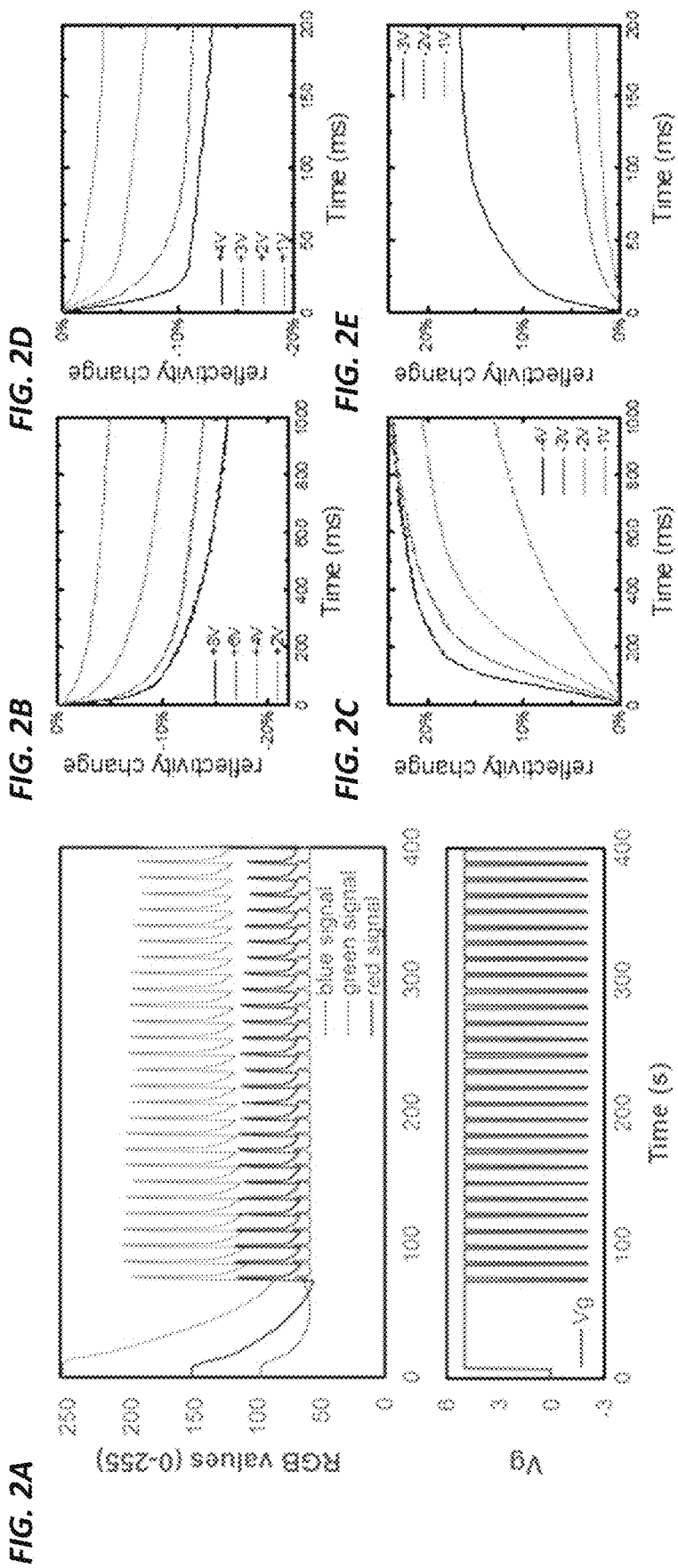

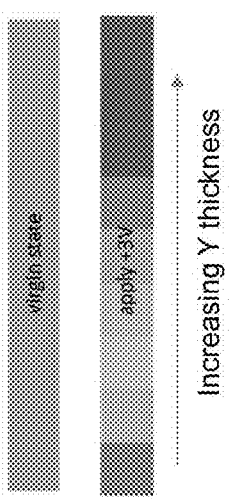
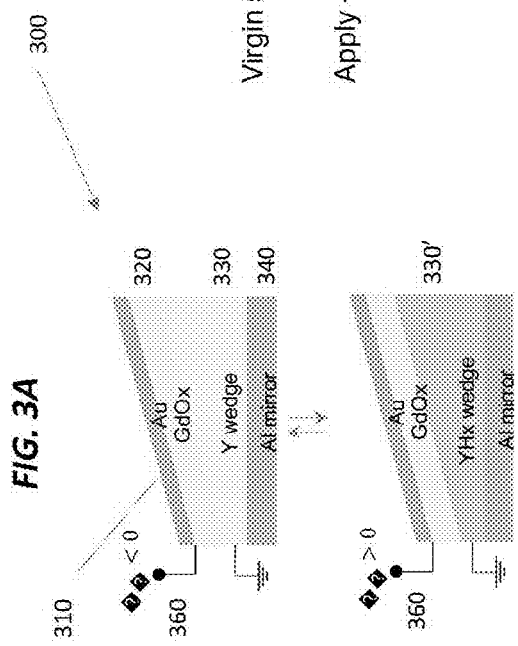
FIG. 3A
FIG. 3B
FIG. 3C
FIG. 3D

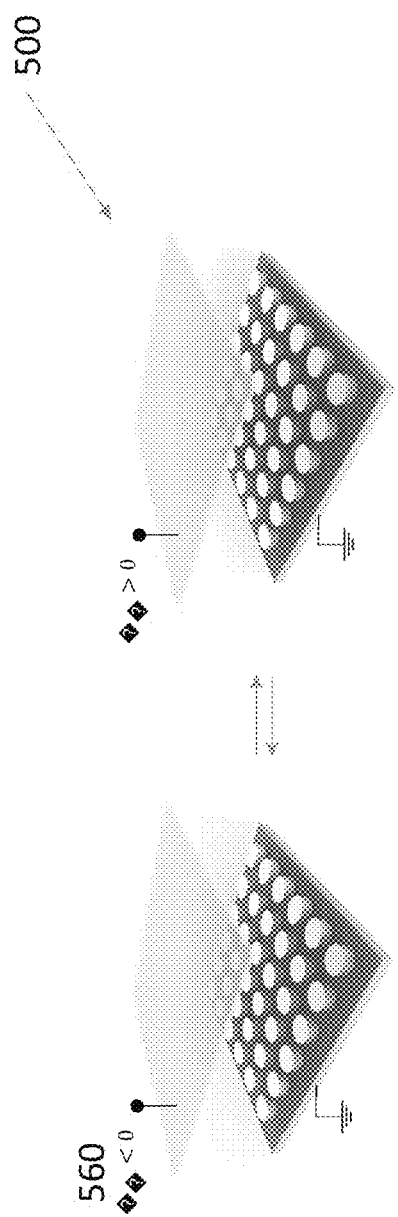
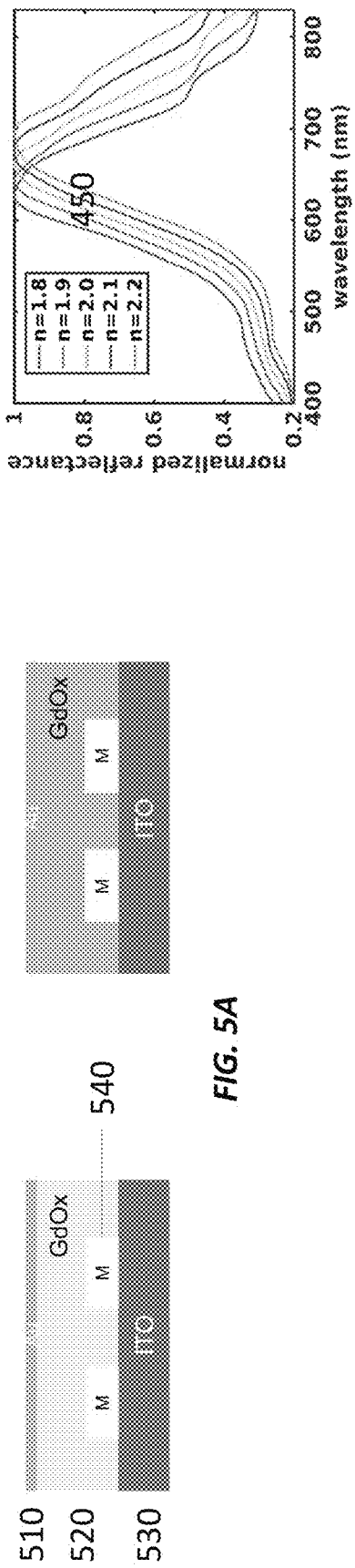
FIG. 5A
FIG. 5B

VOLTAGE-CONTROLLED OPTICAL DEVICES

CROSS-REFERENCE TO RELATED APPLICATION(S)

This application claims the priority benefit, under 35 U.S.C. § 119(e), of U.S. Application No. 62/522,308, entitled "Voltage Controlled Solid State Plasmonic Device," which was filed on Jun. 20, 2017, and is incorporated herein by reference.

GOVERNMENT SUPPORT

This invention was made with Government support under Grant No. DMR-1419807 awarded by the National Science Foundation. The Government has certain rights in the invention.

BACKGROUND

Electrically tuning the optical properties of materials has been extensively studied. Efforts to date have been focused on using liquid crystals, electrochromic materials, and phase change materials to achieve such tunability. These means of controlling optical properties have enabled numerous important applications, including optical filters and displays.

Electrochromic and phase change materials offer optical property modulation in all solid-state devices and are compatible with microelectronic processes. They can be used to make high-resolution displays and compact optical modulators. Electrochromic technology has achieved high contrast switching and low power consumption. However, conventional electrochromic devices require an ion storage layer, which increases the overall thickness of the gated layers and complicates the fabrication process.

Recently, phase change materials have been used to control optical properties electrically. They can achieve high localization and non-volatile switching, but nucleation-dominated crystallization limits their ability to achieve uniform reversible switching.

SUMMARY

Embodiments of the present technology include a device comprising a first electrode, a second electrode, a solid electrolyte disposed between the first electrode and the second electrode, and a voltage source in electrical communication with the first electrode and the second electrode. In operation, the voltage source applies a voltage across the first and second electrodes. This voltage splits water into oxygen and protons at an interface between the first electrode and the solid electrolyte. The source of this water can be moisture in the surrounding atmosphere, liquid water, or a water containing layer, such as a gel. The electric field drives the protons toward the second electrode. And the protons cause a change in an optical property of the solid electrolyte. This change may occur within about 100 seconds of the voltage application. In some embodiments, this change may occur in about 100 milliseconds, 10 milliseconds, or 1 millisecond, or any value between 1 millisecond or 100 seconds. The device may operate at room temperature, e.g., around 20° C. It may also operate at elevated temperatures, up to about 300° C.

The first electrode can be Au, Ag, Pt, Pd, Ir, Rh, Cu, Ni, or alloys of two or more of elements.

The first electrode can be permeable enough to pass the water to the interface between the first electrode and the solid electrolyte. It can also comprise a conductive plasmonic nanostructure, in which case the change in the optical property of the solid electrolyte shifts a wavelength of a plasmonic resonance of the conductive nanostructure. The plasmonic nanostructure may be disposed on top of the electrode or between the electrode and the solid electrolyte. It may absorb protons too, causing its optical properties to change as well.

The solid electrolyte can comprise a rare earth oxide $RE_2O_{3-\delta}$, where RE is at least one of La, Pr, Nd, Sm, Eu, Gd, Tb, Ho, Yb, or Y and $\delta$ is between 0.01 and 0.5. The oxide electrolyte may alternatively comprise mixtures of two or three of these rare earth elements. The rare earth oxide may further incorporate water so as to be intermediate between $RE_2O_{3-\delta}$ and $RE(OH)_3$. The solid electrolyte can have a thickness of about 4 nm to about 80 nm. And the solid electrolyte's proton conductivity may be about $10^{-11}$ siemens/meter to about $10^{-7}$ siemens/meter at room temperature.

The solid electrolyte may be an oxide with a bixbyite crystal structure.

The oxide electrolyte may be an oxide or mixed hydroxide including one or more transition metal elements, including Ta, V, W, Zr, Hf, Ti, Nb, Mn, Cr.

The oxide electrolyte may include a proton conducting perovskite such as $BaCe_{1-x}M_xO_{3-\delta}$ or $BaZr_{1-x}M_xO_{3-\delta}$; M=Y, Yb.

The device may include layers of more than one of the aforementioned oxides disposed between the two electrodes.

The second electrode may include magnesium, yttrium, or lanthanum, or an alloy of these elements, in which case the protons cause the magnesium, yttrium, lanthanum, or alloy to change from a reflective state to a transparent state. The electrode material may contain additional elements, including one or more of Sc, Gd, Sm, Ni, Co, Zr, Ti, Ca, Ba, and Sr. The second electrode may also have a Pd layer adjacent to it, separating it from the solid electrolyte and may serve as a catalyst.

The device may also include a water storage layer, disposed on the first electrode, to provide the water via the first electrode. Alternatively, or in addition, it may include a substrate and a dielectric layer disposed between the substrate and the second electrode. There may further be a reflective layer disposed between the substrate and the dielectric layer to serve as a reflective surface.

This dielectric layer's refractive index may be different than the solid electrolyte's refractive index. The device can also include a plasmonic nanostructure formed in the solid electrolyte, or at the interface between the electrolyte and the second electrode, in which case the change in the solid electrolyte's optical property or insertion of hydrogen into the plasmonic nanostructure can shift a wavelength of a plasmonic resonance of the plasmonic nanostructure. And it can include a metal layer disposed over at least a portion of the plasmonic nanostructure. Alternatively, or in addition, the second electrode may include magnesium, yttrium, lanthanum, or an alloy of one or more of these elements, and may also contain additional elements, in which case the protons cause the electrode to change from a reflective state to a dielectric state.

Other embodiments include a method that involves applying a voltage across a solid electrolyte with a first electrode and a second electrode. The voltage splits water into oxygen ions and protons at an interface between the first electrode and the solid electrolyte. It also generates an electric field that drives the protons toward the second electrode, where the protons cause a change in an optical property of the solid electrolyte. The solid electrolyte may absorb the water from a surrounding atmosphere via the first electrode or from a water storage layer disposed on the first electrode.

An example device may include a layer of noble metal, a layer of magnesium, a layer of gadolinium oxide disposed between the layer of noble metal and the layer of magnesium, and a voltage source in electrical communication with the layer of noble metal and the layer of magnesium. In operation the voltage source applies a voltage across the electrodes on either side of the gadolinium oxide. The voltage splits water into oxygen ions and protons at an interface between the layer of noble metal and the gadolinium oxide. The voltage creates an electric field that drives the protons toward the layer of magnesium. And the protons change the layer of magnesium from a reflective state to a non-reflective state.

The device may also incorporate a plasmonic metallic nanostructure in communication with the second electrode, such that the change in the optical property of the solid electrolyte shifts a wavelength of a plasmonic resonance of the conductive nanostructure.

The plasmonic nanostructure that is in communication with the second electrode may exhibit a shift of a wavelength of a plasmonic resonance due to incorporation of hydrogen or protons within the plasmonic nanostructure or within a metallic layer adjacent to the plasmonic nanostructure. The plasmonic nanostructure may contain Mg, Al, Au, or Ag, or combinations of these elements.

All combinations of the foregoing concepts and additional concepts discussed in greater detail below (provided such concepts are not mutually inconsistent) are part of the inventive subject matter disclosed herein. In particular, all combinations of claimed subject matter appearing at the end of this disclosure are part of the inventive subject matter disclosed herein. The terminology used herein that also may appear in any disclosure incorporated by reference should be accorded a meaning most consistent with the particular concepts disclosed herein.

BRIEF DESCRIPTIONS OF THE DRAWINGS

The patent or application file contains at least one drawing executed in color. Copies of this patent or patent application publication with color drawing(s) will be provided by the Office upon request and payment of the necessary fee.

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

FIG. 1A shows a profile of a solid-state device whose color is electrochemically switchable.

FIG. 1B shows perspective views of the solid-state device of FIG. 1A switched between on (left) and off (right) states.

FIG. 1E shows simulated reflected color an electrochemically switchable solid-state device as a function of the refractive index of the gadolinium oxide ($GdO_x$) solid electrolyte layer.

FIG. 2A shows plots of applied voltage (bottom) and 8-bit red-green-blue (RGB) values versus time averaged over the top electrode of a solid-state device with an electrochemically switchable refractive index.

FIG. 2B shows reflectivity as a function of time for a solid-state device with an electrochemically switched 50 nm $GdO_x$ film measured by a 660 nm laser switching from $V_G=-4$ V to the voltages labeled on the inset.

FIG. 2C shows reflectivity as a function of time for a solid-state device with an electrochemically switched 50 nm $GdO_x$ film measured by a 660 nm laser switching from $V_G=+8$ V to the voltages labeled on the inset.

FIG. 2D shows reflectivity as a function of time for a solid-state device with an electrochemically switched 10 nm $GdO_x$ film measured by a 660 nm laser switching from $V_G=-3$ V to the voltages labeled on the inset.

FIG. 2E shows reflectivity as a function of time for a solid-state device with an electrochemically switched 10 nm $GdO_x$ film measured by a 660 nm laser switching from $V_G=+4$ V to the voltages labeled on the inset.

FIG. 3A shows a reflective solid-state device with an electrochemically switchable solid oxide on a wedge-shaped yttrium bottom electrode that absorbs protons in an unswitched, reflective metallic state.

FIG. 3B shows the reflective solid-state device of FIG. 3A with the wedge-shaped yttrium bottom electrode in a switched, unreflective dielectric state.

FIG. 3C illustrates experimentally measured transmission images of the switchable device before (top) and after (bottom) of an applied voltage of +3 V (bottom).

FIG. 3D illustrates simulated transmission images of the switchable device before (top) and after (bottom) of an applied voltage of +3 V (bottom).

FIG. 5A illustrates operation of an electrochemically switchable solid-state thin-film device with a plasmonic nanostructure (e.g., a nanodisk array) embedded in a solid electrolyte layer.

FIG. 5B is a plot of the simulated wavelength shift of the reflectance peak with applied voltage for the electrochemically switchable solid-state thin-film device of FIG. 5A.

DETAILED DESCRIPTION

Figure 1C:
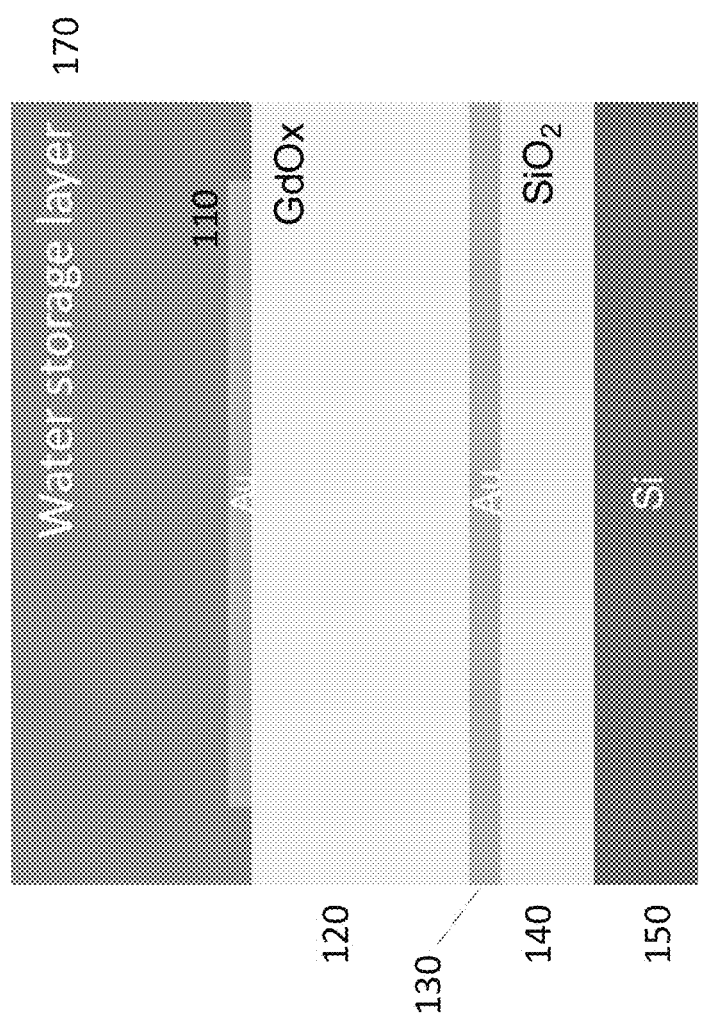
FIG. 1C shows a profile of the solid-state device of FIG. 1A with a water storage layer disposed on the top electrode.

Electrochemical processes can be used to reversibly control the optical properties of solid-state materials for optical switching and optical modulation. Applying an electric field to a solid electrolyte can transport ions that modify the optical properties of the solid electrolyte. (The ions may change the solid electrolyte's other properties as well, including its density and conductivity.)

These ions can be incorporated into a storage layer or can be inserted from an external reservoir. The ions can also be generated by electrochemical processes occurring at the interface between the external environment and the solid electrolyte surface or the electrolyte/electrode boundary. By sourcing ions from the surrounding atmosphere, one can remove the need for an ion storage layer and decrease the working thickness significantly. For example, protons can be obtained from the moisture in the ambient atmosphere through a water-splitting reaction, which can be catalyzed at the interface between a metal-oxide and a metal electrode.

The solid electrolyte's working thickness can be as little as 10 nm, giving solid-state devices based on electrochemical modulation of optical properties great utility for highly localized optical property modulation. In some cases, the optical property change can be a refractive index modulation of up to about 0.4, enabling programmable photonic devices including optical modulators, optical phase shifter, beam steering devices, and dynamic holographic optical elements. The device's operating temperature can range from 10° C. and 300° C. and may be room temperature.

Moreover, the simple device structure enables very versatile applications, including interference color and transmission switching and plasmonic color switching. These applications include, but aren't limited to, active plasmonic devices and reconfigurable metamaterials for low power consumption solid state displays with high pixel density and dynamic holography.

Electrochemical Switching in Thin-Film Solid-State Devices

FIG. 1A shows a profile view of a thin-film solid-state device 100 that can be used for optical switching and modulation. The device 100 includes a thin layer of a metal (e.g., a noble metal like Au, Ag, or Pt) that serves as a top electrode 110, a thin film (e.g., 35 nm thick) of $GdO_x$, $Y_2O_3$, or $ZrO_2$ as a solid electrolyte 120, and a bottom electrode (Ta/Au) layer 130. The bottom electrode 130 is on an optional dielectric film 140, which in turn is on an optional semiconductor substrate 150, illustrating that the device 100 can be made using complementary metal-oxide-semiconductor (CMOS) fabrication processes. Other suitable substrates include flexible substrates, such as polyethylene terephthalate (PET), or reflective substrates, such as metals. Reflective layers can also be disposed on the substrates. The $SiO_2$ layer 140 can be of uniform or variable thickness, e.g., as a wedge whose thickness increases from 100 nm to 400 nm over a range of 2 cm. The device 100 also includes a voltage source 160 that is connected to the electrodes 110, 130 and that can be used to actuate the device's optical properties, including its transmission, reflection, and/or absorption.

Suitable oxide materials for the solid electrolyte 120 may have high proton conductivities and include, but are not limited to rare earth oxides of the form $RE_2O_{3-\delta}$, where RE is any one of La, Pr, Nd, Sm, Eu, Gd, Tb, Ho, Yb, or Y. These rare earth oxides include $Y_2O_3$ and $ZrO_2$ in addition to $GdO_x$. The oxide nonstoichiometry $\delta$ can be between 0.01 and 0.5. The oxide electrolyte may alternatively comprise mixtures of two or three of these rare earth elements. The rare earth oxide may further incorporate water so as to be intermediate between $RE_2O_{3-\delta}$ and $RE(OH)_3$. The oxide electrolyte may have a crystal structure corresponding to the bixbyite structure. The oxide electrolyte may be an oxide or mixed hydroxide including one or more transition metal elements, including Ta, V, W, Zr, Hf Ti, Nb, Mn, and Cr. For the device to work properly, the oxide in the solid electrolyte 120 should be exposed to water vapor before it is covered with the top electrode 110. As a result, the solid electrolyte 120 has some hydroxide content.

The top (water-splitting) electrode 110 may be made of Au, Ag, Pt, Pd, Ir, Rh, Cu, Ni, or alloys of these elements.

The device 100 is very efficient at harvesting and splitting water from the ambient atmosphere, which is consistent with findings that nanoparticles on an oxide surface can interact to become excellent catalysts for cleaving water molecules. The layer of Au in the top electrode 110 is thin (e.g., 3 nm) so that water and oxygen can diffuse through it easily. By applying a positive gate voltage $V_G$, which may about 1.5 V or higher (e.g., 2 V, 3 V, 4 V, or 5 V), to the top electrode 110 with the voltage source 160, moisture content in the ambient atmosphere splits to $H^+$ and $O_2$ at the interface between the top electrode 110 and the solid electrolyte 120 with charge conservation ensured by electron transfer at the electrodes. The top electrode 110 may conduct electrons generated by the splitting to an external circuit. The protons ($H^+$) are then transported through the solid electrolyte 120, which has a proton conductivity of about $10^{-11}$ siemens/meter to about $10^{-7}$ siemens/meter (e.g., $10^{-9}$ siemens/meter) at room temperature, to the bottom electrode 130, where they combine with electrons from the bottom electrode 130 before getting incorporated into the $GdO_x$ film 120 and in some cases the bottom electrode 130. This transport and incorporation process changes one or more of the $GdO_x$ film's optical properties, such as its refractive index, absorption, or thickness. At room temperature, this change occurs in less than, e.g., 100 second, and can be as fast as 1 millisecond or even 1 microsecond, depending on the device geometry, device composition, and applied voltage.

FIG. 1B shows a perspective view of the device 100 implemented in a cross-bar arrangement with the bottom electrode 130 going horizontally and the top electrode 110 going vertically across the solid electrolyte 120 at the cross point of the cross-bar. In this example, the cross point, or gated region, of the solid electrolyte 120 is defined as a 200 μm×200 μm square; other shapes and dimensions are also possible. This gated region and the electrodes can be replicated in a matrix arrangement to create a pixelated spatial light modulator.

FIG. 1C illustrates the device 100 of FIG. 1 with a water-containing layer 170 on the top electrode 110. This water-containing layer 170 may be made of a water-absorbing polymer, hygroscopic oxide, polymer gel, or liquid water layer. It provides water for the reaction, eliminating the need for moisture in the surrounding atmosphere and making it possible for the device 100 to operate in dry environments.

Color Changes Through Electrochemical Switching

Figure 1D:
FIG. 1D shows optical images of a fabricated electrochemically switchable solid-state device after application of +6 V for 180 seconds in different gas environments.

FIG. 1D shows images of a fabricated gated region under different ambient atmospheres, at room temperature before (top) and after (bottom) application of a +6 V gate voltage for 180 seconds. The gated region has a $SiO_2$ thickness of 260 nm and appears blue due to interference in an interference cavity formed by the $GdO_x$ layer 120 and $SiO_2$ layer 140. When a gate voltage is applied to the top electrode 110, an electrochemical reaction changes the optical properties of the $GdO_x$ layer 120, tuning the cavity resonance and the reflected color. This color change can be detected visually or using interferometric methods.

The images in the first column of FIG. 1D show the color change observed when a positive voltage +6 V is applied to the top electrode of device in ambient atmosphere for 180 seconds at room temperature. The voltage causes the device to split water from the atmosphere into oxygen and protons. The protons migrate into the $GdO_x$ layer 120, changing its refractive index and/or its thickness and causing the device to appear green instead of blue.

The images in the other columns of FIG. 1D illustrate how water content in the surrounding atmosphere affects switching: each column includes images of identical devices, before (top) and after (bottom) switching, under different atmospheric conditions. The images in the top row of FIG. 1D show the devices in their original states. Then the devices were placed in a chamber, and the chamber was pumped down towards vacuum. After the vacuum level reached $10^{-3}$ Torr, dry nitrogen, dry oxygen, or wet nitrogen was introduced into the chamber for each device. After the pressure level reached 20 Torr, +6 V was applied to the top electrode of each device for 180 seconds, and then the device was left in an open-circuit condition. The same +6 V, 180-second voltage application was also performed for one device at vacuum without introducing gas into the chamber. The bottom row of images in FIG. 1D shows these devices after the voltage applications. The images in FIG. 1D show that, for the same applied voltage, the change in reflected color occurred when there was water in the environment, but not otherwise.

FIG. 1E shows the simulated reflected color of the devices shown in FIG. 1D as a function of the refractive index of the $GdO_x$ layer. The simulations were performed using the transfer matrix method disclosed in O. S. Heavens, "Optical Properties of Thin Solid Films," (Dover Publications, Inc., 1991), which is incorporated herein by reference in its entirety. The refractive index of $GdO_x$ in its original state was taken as 1.8 in the visible range and increases to 2.4 under the applied voltage. By increasing the refractive index of $GdO_x$, the simulated colors agreed with the observed color changes shown in FIG. 1D. This suggests that the applied voltage increases the refractive index of the $GdO_x$ layer in the visible range, causing the observed color change.

The color from thin film-interference depends on the optical properties and thicknesses of the solid state and dielectric layers. This dependence makes it possible to fabricate devices with different pristine colors that undergo voltage-induced changes to different colors. Along the wedge with different $SiO_2$ thicknesses, a range of interference colors and color changes can be achieved.

Figure 1F:
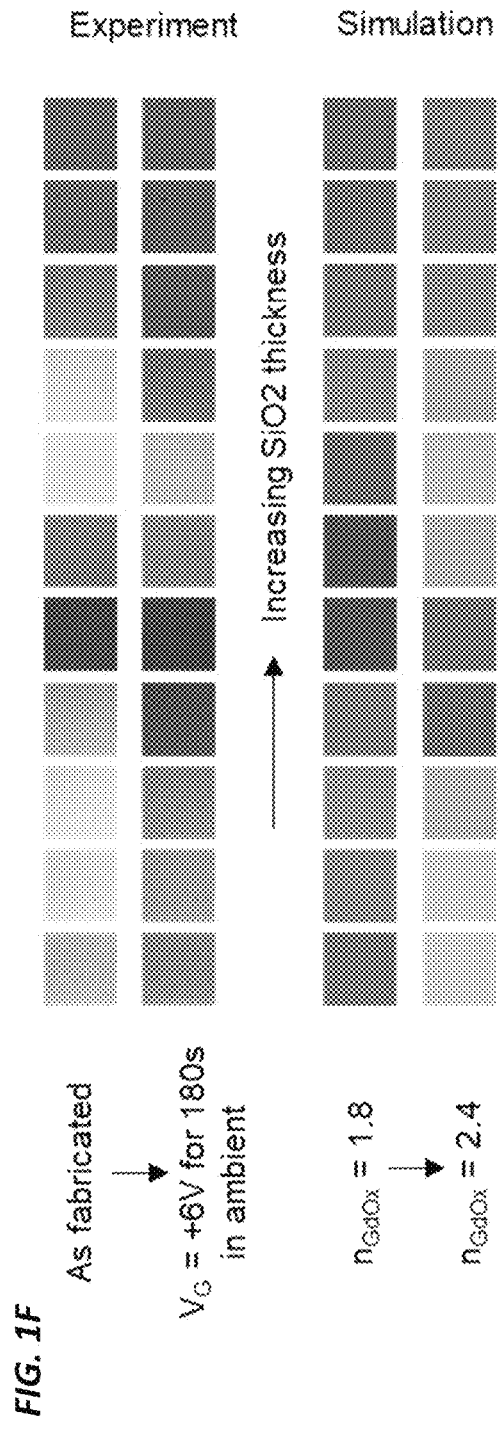
FIG. 1F shows optical images of fabricated electrochemically switchable solid-state devices (upper rows) and simulated colors (lower rows) with increasing $SiO_2$ thickness from left (100 nm) to right (400 nm).

FIG. 1F shows actual pictures (upper pair of rows) and simulated pictures (lower pair of rows) of several gated regions formed on a single wedged dielectric layer 140 and substrate 150. Each gated region is stack of Au (3 nm)/$GdO_x$ (50 nm)/Au (3 nm)/Ta (3 nm) on a $SiO_2$ wedge whose thickness increases from 100 nm to 400 nm. The $SiO_2$ wedge is on a silicon substrate. Each gated region is on a different portion of the dielectric wedge 140. Each gated region is so much smaller than the total length of the dielectric wedge 140, so the change of thickness of $SiO_2$ under each gated region is around 3 nm and therefore the thickness of $SiO_2$ under each gated region is treated as uniform.

In each pair of rows in FIG. 1F, the upper row shows the device in its original state and the lower row shows the device after a +6 V, 180-second voltage application in ambient atmosphere at room temperature. Together, these pictures show that color varies with dielectric layer thickness. The color can also be tuned by changing the thicknesses of the $GdO_x$ and Au layers (solid electrolyte 120 and upper electrode 110). This gives several degrees of freedom for setting a device's modulated and unmodulated colors, and the material choice can be changed to optimize the vibrancy and to get desired color change.

Reversible Color Changes

FIGS. 2A-2E are plots of measurements showing that the color changes shown in FIGS. 1D and 1F are reversible. To demonstrate the color change is reversible, a square wave swinging from +5 V to −2 V was applied as a gate voltage to a device with a $SiO_2$ (380 nm)/Ta (3 nm)/Au (10 nm)/$GdO_x$ (40 nm)/Au (3 nm) layer stack grown on a silicon substrate. The device was imaged with a microscope camera during application of the gate voltage. FIG. 2A shows the average 8-bit red, green, and blue (RGB) values of the gated region and the $V_G$ waveform. The switching was reversible after the first cycle.

FIGS. 2B-2E show the switching transient with different applied voltages. These measurements were by shining 660 nm laser light on devices with a layer structure of $SiO_2$ (400 nm)/Ta (3 nm)/Au (3 nm)/$GdO_x$/Au (3 nm) and measuring the intensity of the reflected light with a diode detector at different applied voltages. Each trace represents a different applied voltage. FIGS. 2B and 2C show the percentage reflectivity change with a $GdO_x$ layer thickness of 50 nm, and FIGS. 2D and 2E show the percentage reflectivity change with a $GdO_x$ layer thickness of 10 nm. In both structures, the switching becomes faster as the amplitude of the driving voltage increases and as the thickness of the $GdO_x$ layer decreases. With +4 V/−3 V applied to the device with a $GdO_x$ thickness of 10 nm, switching times shorter than 100 ms can be achieved. This indicates that it is possible to achieve fast, reversible optical modulation with only 10 nm of $GdO_x$.

Proton-Pumped Electrodes

FIGS. 3A and 3B show an electrochemically switched solid-state device 300 with a solid electrolyte later 320 sandwiched between a gold upper electrode 310 and a bottom electrode 330 made of a yttrium wedge. The device can be made with a layer structure of Ta (3 nm; not shown)/Al (100 nm)/Y(wedge 50-100 nm)/Pt (3 nm; not shown)/$GdO_x$ (35 nm)/Au (3 nm) on a silicon substrate. The 3 nm Pt layer protects yttrium wedge 330 from oxidation during deposition while allowing hydrogen to diffuse into the yttrium wedge 330.

Many materials have optical properties that change with hydrogen loading. These materials include, but are not limited to Y, Mg, La, Mg—Y, Mg—La, Mg—Sc, Mg—Gd, $Mg_2Ni$, and $WO_3$. This hydrogen absorption changes their optical properties, including their refractive indices. This change can be exploited in the device 300 of FIGS. 3A and 3B by applying a positive voltage $V_G$ to the top electrode 310 with a voltage source 360. The voltage generates hydrogen ions from ambient moisture and pumps the hydrogen ions towards the bottom electrode 330, which may be made of Y, Mg, La, Mg—Y, Mg—La, Mg—Sc, Mg—Gd, $Mg_2Ni$, or $WO_3$. In this case, the electrode 330 is made of yttrium and absorbs the hydrogen and changes from a reflective metallic state 330 (FIG. 3A) to a non-reflective dielectric state $YH_x$ 330' (FIG. 3B).

FIG. 3C shows actual images of the device in FIGS. 3A and 3B before (top) and after (bottom) application of a +3 V gate voltage for different yttrium thicknesses. As fabricated, the yttrium electrode 330 behaves as a mirror, so different yttrium thicknesses yield very similar reflected colors due to thin-film interference in the solid electrolyte layer 320 and reflection at the interface between the solid electrolyte layer 320 and the yttrium electrode 330. Applying the voltage causes different color changes because the yttrium hydride layer 330' behaves like a dielectric after absorbing hydrogen, causing thin-film interference in the solid electrolyte layer 320 and dielectric yttrium layer 330' and reflection at the interface between the yttrium hydride layer 330' and the aluminum mirror 340. In other words, applying the voltage changes the refractive index of the $GdO_x$ and yttrium layers and increases the absorption and the resonant cavity length. The thickness of the yttrium hydride layer 330' varies along the wedge, so the resonance cavity length changes as a function of transverse position along the wedge, causing different parts of the device 300 to reflect different colors.

FIG. 3D shows a simulation of the measurements in FIG. 3C, with the refractive index of $GdO_x$ taken to increase to 2.4 with voltage application. There is good agreement between the simulation in FIG. 3D and the experimental measurements in FIG. 3C, indicating that the electrochemical reaction splits water into protons that move to and are incorporated into the bottom electrode.

Transmissive Switching and Spatial Light Modulation

Figure 4C:
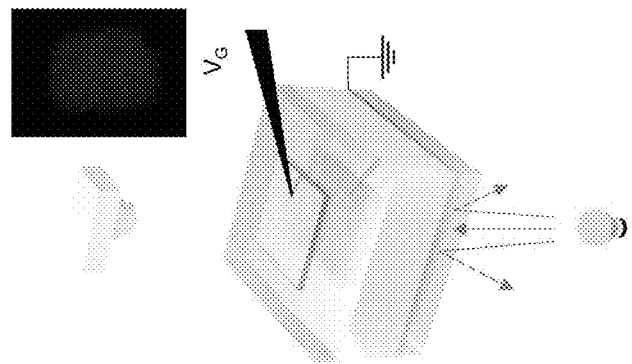
FIGS. 4A-4C illustrate operation of an electrochemically switchable solid-state thin-film device with a bottom electrode that switches between a reflective metallic state and an unreflective dielectric state.
Figure 4B:
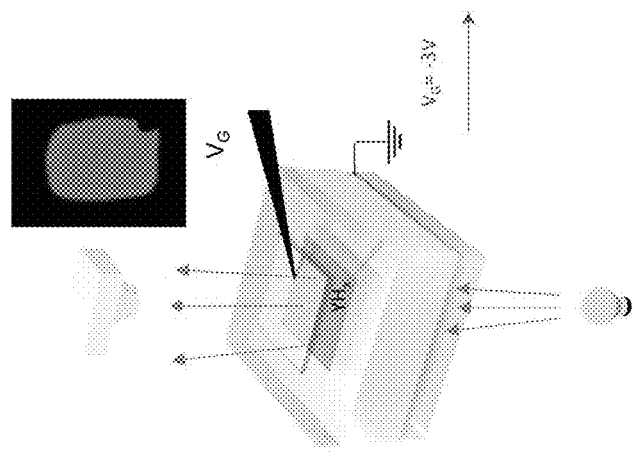
Figure 4A:
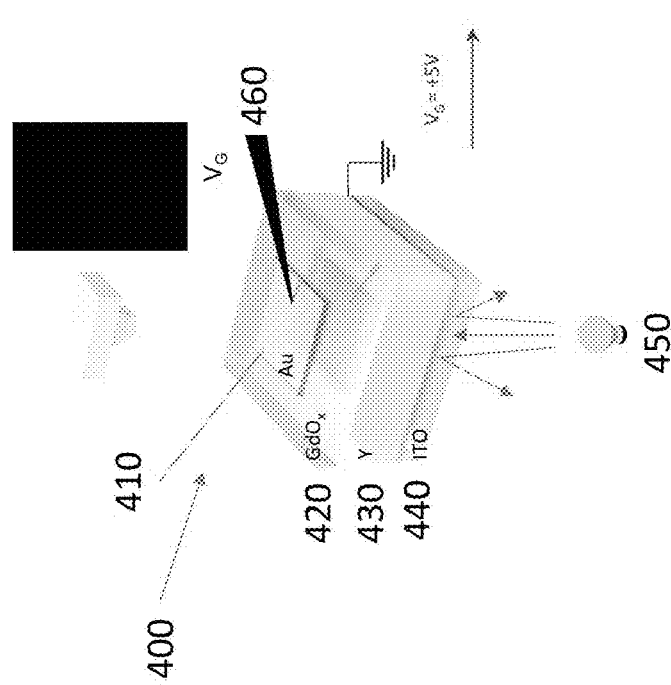

FIGS. 4A-4C illustrate how switching the optical properties of a metallic layer can change the transmission of a solid-state device 400, e.g., for use as a spatial light modulator, variable attenuator, variable filter, or switch. The device 400 has a 3 nm thick gold electrode 410 on a 35 nm thick $GdO_x$ electrolyte layer 420, which in turn is on a 100 nm thick yttrium electrode 430. The device includes a 5 nm layer of palladium (not shown) between the electrolyte layer 420 and the yttrium electrode 430. The yttrium electrode 430 is fabricated on a glass substrate 440 coated with indium tin oxide (ITO). A voltage source 460 connected to the top electrode 410 actuates the device 400.

The insets of FIGS. 4A-4C are photographs illustrating how the solid-state device 400 can be used in transmission for reversible switching. The device 400 was placed on a light emitting diode (LED) backlight panel 450. As fabricated, the yttrium layer 430 transmits very little light, so the inset in FIG. 4A is dark. After a gate voltage $V_G$=+5 V was applied for 120 seconds, the yttrium layer 430 became yttrium hydride, and more light was transmitted through the device (FIG. 4B, inset). Applying a negative gate voltage of $V_G$=−3 V for one hour to reverse the change, causing the transmitted image became dark again (FIG. 4C, inset).

Electrochemically Switched Plasmonic Devices

FIGS. 5A and 5B illustrate how electrochemical switching can be applied to achieve switchable plasmonic color, which is useful for spatial color modulation at a spatial resolution finer than the diffraction limit. FIG. 5A shows an electrochemically switchable plasmonic device 500 with a plasmonic nanostructure—here, a metal nanodisk array 540—embedded in a gadolinium oxide layer 530, which is sandwiched between a thin gold electrode 510 and a thicker ITO electrode 540. The device 500 exhibits a reflectance peak at about 610 nm. Applying a positive voltage across the gadolinium oxide layer 530 with a voltage source 560 coupled to the top electrode 510 increases the gadolinium oxide layer's refractive index, shifting the reflectance peak wavelength from about 610 nm to about 700 nm as shown in FIG. 5B. Applying a negative voltage across the gadolinium oxide layer 530 decreases the gadolinium oxide layer's refractive index, shifting the reflectance peak wavelength from about 700 nm to about 610 nm as shown in FIG. 5B.

Figure 6B:
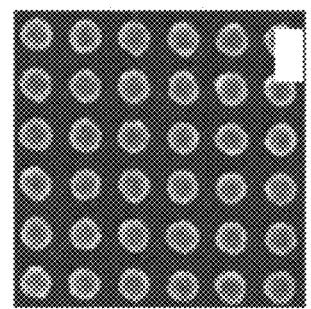
FIG. 6B illustrates the nanodisk array fabricated in an electrochemically switchable solid-state thin-film plasmonic device like the one shown in FIG. 6A.
Figure 6A:
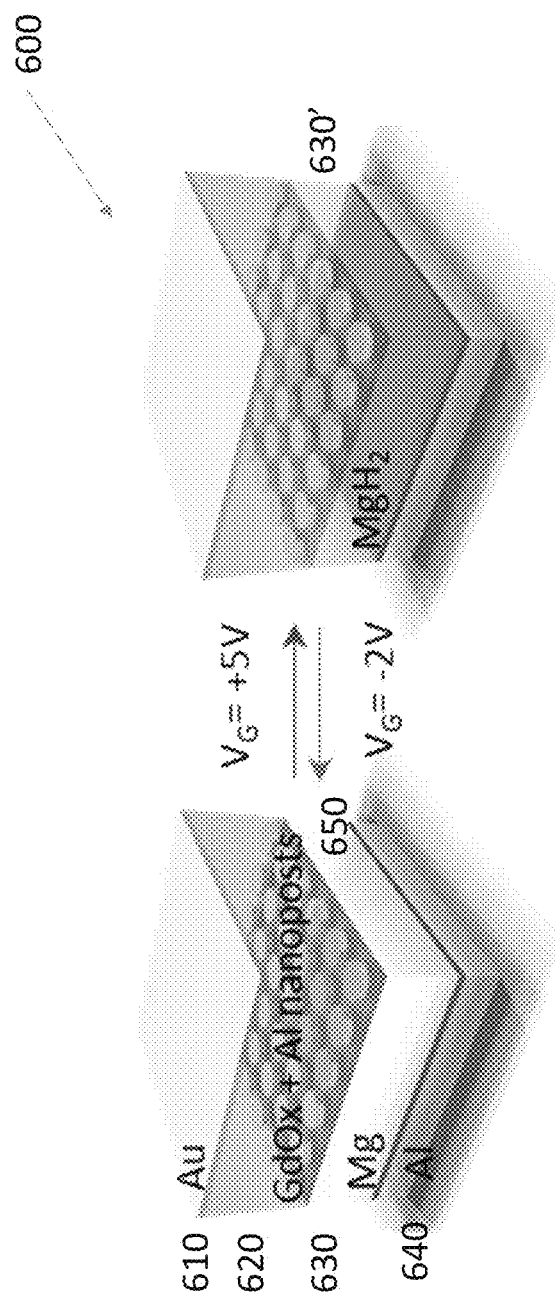
FIG. 6A illustrates operation of an electrochemically switchable solid-state thin-film plasmonic device with a plasmonic nanostructure (e.g., a nanodisk array) embedded in the electrolyte layer.

FIG. 6A shows a switchable plasmonic device 600 with a plasmonic structure 650 embedded in a solid electrolyte layer 620 on a magnesium electrode 630. The device 600 was made with an optically thick (e.g., 100 nm) aluminum layer on silicon as the substrate 640. Layers of magnesium (40 nm), palladium (5 nm), and $GdO_x$ (5 nm) were deposited on the substrate 640 to form the magnesium electrode 630 and part of the solid electrolyte 620. Then a palette of square patches containing aluminum nanodisks were fabricated on the $GdO_x$. Each patch has different post diameters (s) and distances between nearest posts (d).

FIG. 6B shows a typical scanning electron microscope (SEM) image of the nanodisk array with s=120 nm and d=70 nm. The scale bar is 200 nm long. After the nanodisk fabrication, a 35 nm $GdO_x$ layer was deposited on the nanodisks and the 5 nm $GdO_x$ layer, followed by 3 nm Au top electrodes 610. As fabricated, the device forms gap plasmon resonators with Pd/Mg as bottom electrode layer 630, and 5 nm $GdO_x$ as an insulating gap between the bottom electrode 630 and the nanodisks 650. The thickness of this insulating gap determines, to some degree, the color of the device.

Figure 6C:
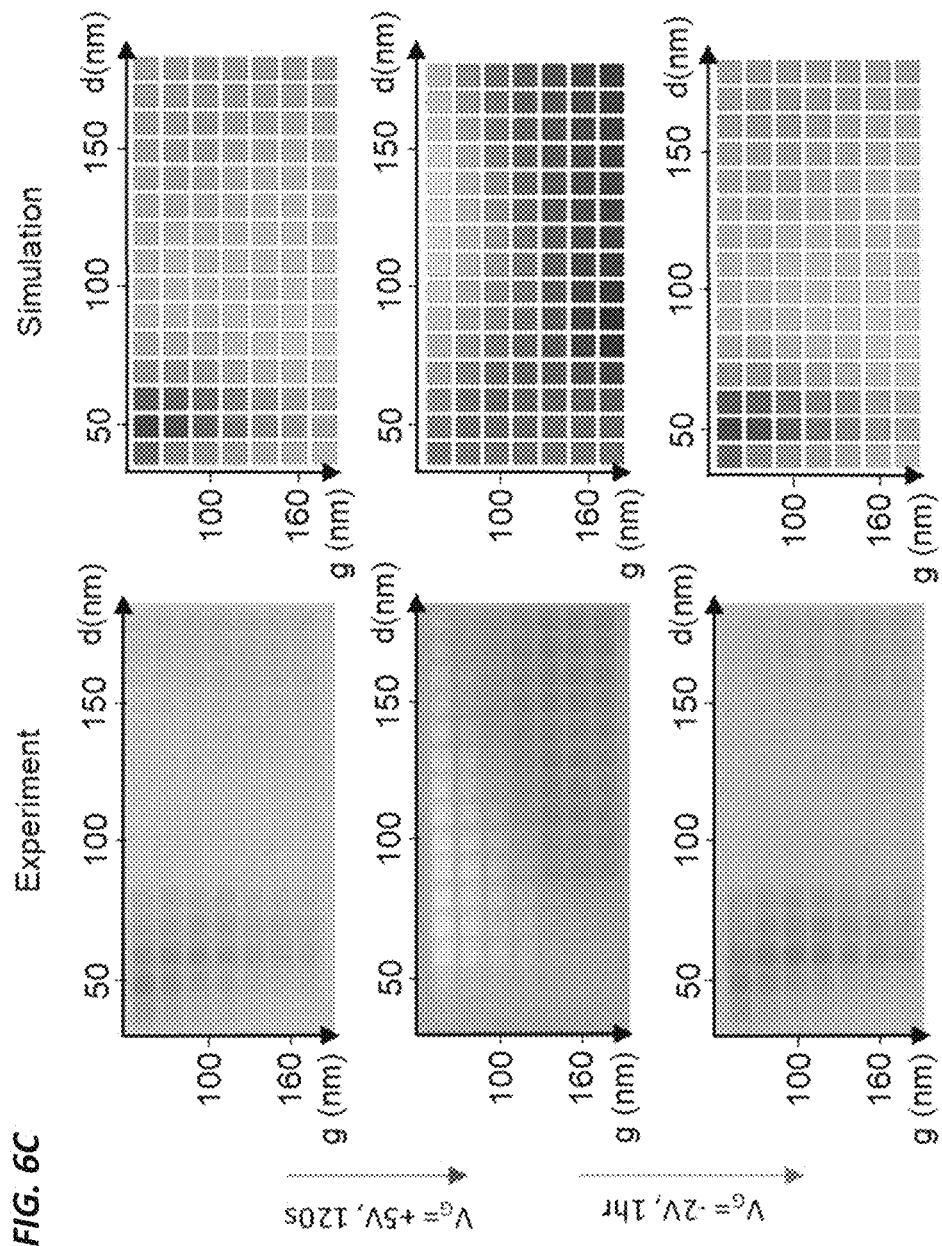
FIG. 6C illustrates actual (left) and simulated (right) images of the electrochemically switchable solid-state thin-film plasmonic device of FIG. 6A.

FIG. 6C shows actual (left) and simulated (right) images of the different patches of nanodisks 650. The actual images were acquired as described above. The simulated images were calculated by finite-difference time-domain (FDTD) simulations. The colors of the devices were then rendered with D65 illuminant. The refractive indices of Ta, Ti, Au, Mg and $SiO_2$ were taken from E. D. Palik, "Handbook of Optical Constants of Solids," (Academic Press, 1985), which is incorporated herein by reference in its entirety. The refractive indices of $YH_3$ and $MgH_2$ were taken from A. T. M. van Gogh et al., "Structural, electrical, and optical properties of La1-zYzHx switchable mirrors," Phys. Rev. B 63, 195105 (2001) and J. Isidorsson et at., "Optical properties of MgH2 measured in situ by ellipsometry and spectrophotometry," Phys. Rev. B 68, 115112 (2003), respectively, and which are incorporated herein by reference in their entireties.

Due to the small gap between the nanodisks 650 and the bottom electrode 630, the gap plasmon resonances for most of the nanodisks 650 with s>80 nm are red-shifted from the visible to the infrared. Therefore, these patches of nanodisks 650 appear to be roughly the same shade of yellow in the top row of FIG. 6C, before a voltage is applied.

The middle row of FIG. 6C shows actual (left) and simulated (right) images of the patches after +5 V voltage application for 120 seconds. When a positive voltage is applied to the top Au electrode 610, hydrogen is pumped into the Mg layer 630 so that it changes from Mg to $MgH_2$, which is transparent at visible wavelengths instead of reflecting visible light like metallic Mg. As a result, the $MgH_2$ and the 5 nm $GdO_x$ together form a dielectric between the nanodisks 650 and the reflective aluminum 640. In other words, applying a positive voltage to the device 600 increases the gap between the bottom of the nanodisks 650 and the closest reflector. This blue-shifts the device's resonance back to the visible portion of the electromagnetic spectrum, with the amount of shift depending on the optical thickness of the Mg layer 630.

The bottom row of FIG. 6C shows actual (left) and simulated (right) images of the device after being subjected to a gate voltage of $V_G = -2$ V for one hour. These images are very similar to those of the device as fabricated (FIG. 6C, top row), showing the reversibility of the plasmonic response switching. The switching mechanism is very flexible and can be incorporated into other plasmonic structures, including disks of different sizes, pitches, and materials; other conductive layers patterned into different shapes (e.g., arrays of squares, hexagons, as well as holes of different shapes, sizes, and pitches, etc.); and more complex structures. The nanodisks 650 can be made of magnesium or other hydrogen-absorbing metals such that they change from plasmonic to dielectric structures and back in response to applied voltages.

Electrochemically Switched Devices with Nanopatterned Electrodes

Figure 7A:
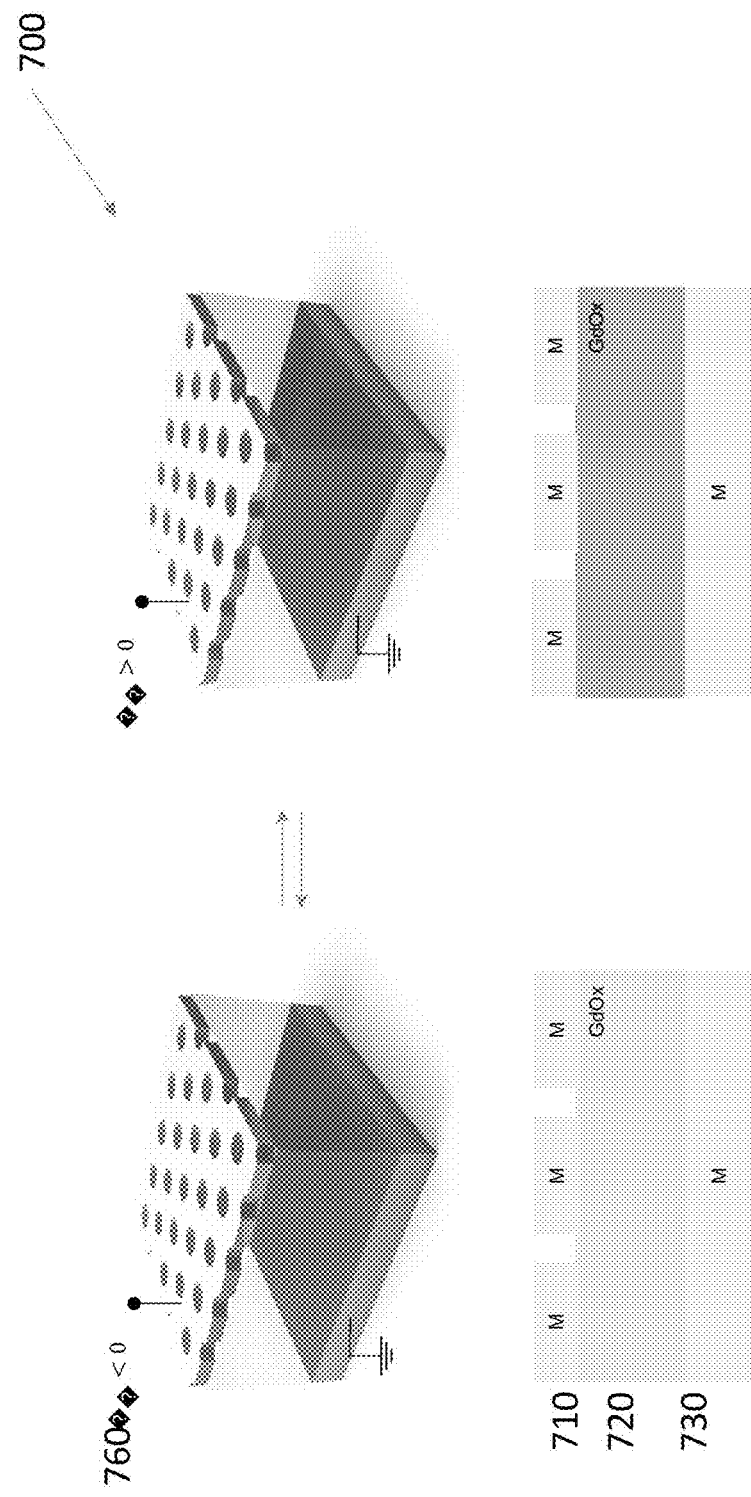
FIG. 7A illustrates operation of a solid-state device with a nanopatterned upper electrode on an electrochemically switchable layer of $GdO_x$.
Figure 7C:
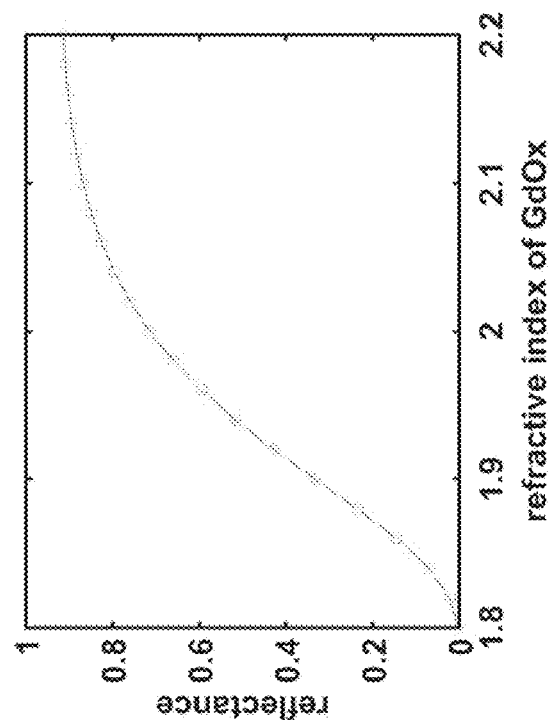
FIG. 7C is a plot of simulated reflectance versus the refractive index of the $GdO_x$ layer for the solid-state device of FIG. 7A.
Figure 7B:
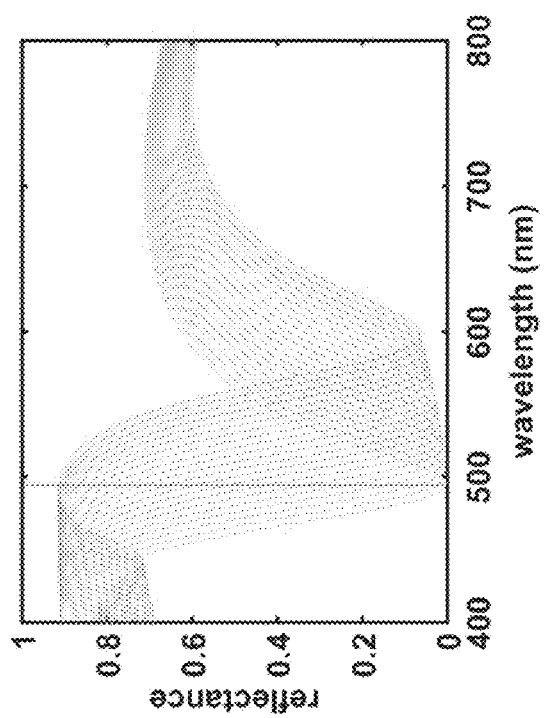
FIG. 7B is a plot of the simulated wavelength shift of the reflectance peak with applied voltage for the solid-state device of FIG. 7A.

FIGS. 7A-7C illustrate an electrochemically switched, solid-state device 700 with a gadolinium oxide electrolyte layer 720 between a solid metal electrode 730 and a nanopatterned electrode 710. In operation, the nanopatterned electrode 710 provides a larger triple phase boundary (i.e., a boundary between an electrode, electrolyte, and gaseous fuel) and provides a channel for moisture to move into and out of the electrolyte layer 720. In some cases, the nanopatterned electrode 710 may also exhibit a plasmonic response that depends on the optical properties of the oxide and bottom layers and which can be tuned by a voltage.

The nanopatterned electrode 710 may be made of gold, silver, platinum, or another suitable conductive material and is patterned with a triangular array of cylindrical holes. Other nanopatterns are also possible, including those with holes of different shapes and sizes and arranged in arrays of different shapes. The nanopatterned electrode 710 is coupled to a voltage source 760 that applies a gate voltage $V_G$ to across the electrolyte layer 720.

As explained above, applying a voltage across the gadolinium oxide electrolyte layer 720 via the nanopatterned electrode 710 and the solid electrode 730 increases the refractive index of the gadolinium oxide electrolyte layer 720 and shifts the center wavelength of the device's reflectance peak. FIG. 7B shows that the center wavelength increases from about 500 nm to about 600 nm—an increase of about 100 nm for a thin device and a relatively low voltage. FIG. 7C shows that the gadolinium oxide electrolyte layer's refractive index increases from about 1.8 to about 2.2 (an increase of over 22%) with an applied voltage of about 5 V.

Figure 8A:
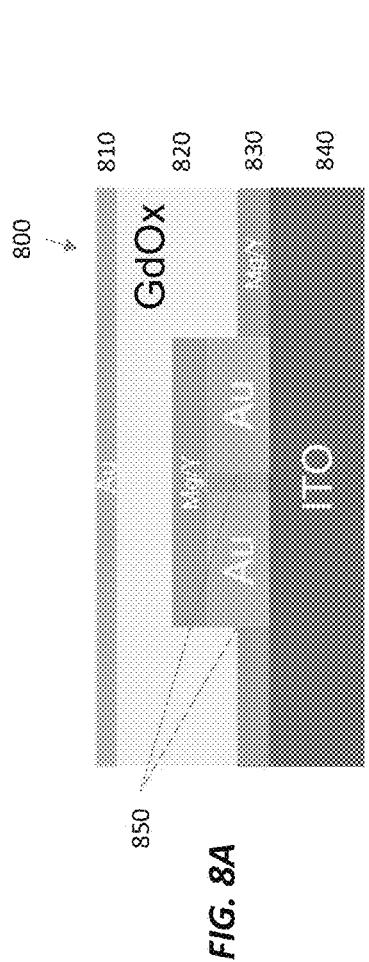
FIG. 8A is a profile view of an electrochemically switchable, solid-state, thin-film plasmonic device that has plasmonic nanostructures with small gaps filled with hydrogen switchable materials embedded in the electrolyte layer.
Figure 8B:
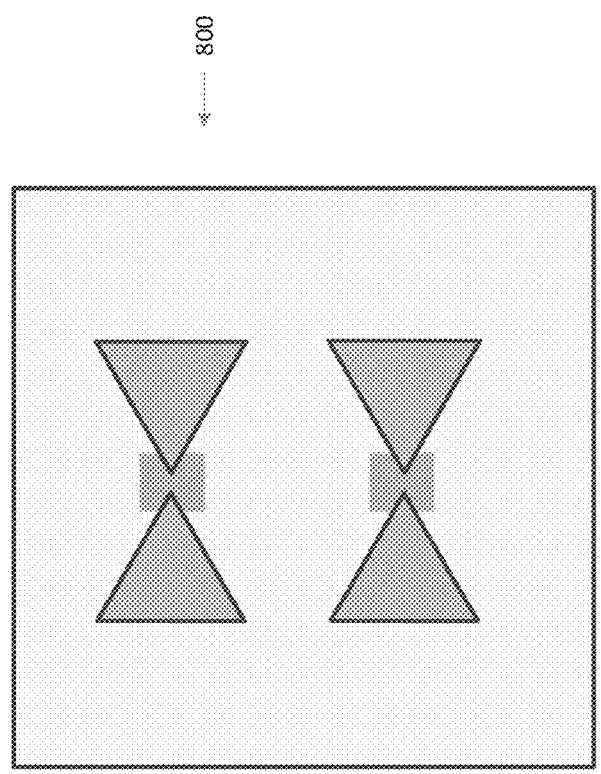
FIG. 8B is a plan view of the solid-state device of FIG. 8A.

FIGS. 8A and 8B show an electrochemically switchable, solid-state, thin-film plasmonic device 800 that has plasmonic nanostructures with small gaps filled with hydrogen switchable materials embedded in an electrolyte layer 820. The electrolyte layer 820 is between a gold electrode 810 and a transparent indium tin oxide (ITO) electrode 840. A plasmonic nanostructure 850 made of gold and formed in the shape of a bowtie is between the ITO electrode 840 and the solid electrolyte 820. And a switchable metal layer 830 (e.g., made of magnesium, yttrium, lanthanum, or an alloy thereof is on the electrolyte side of the gold plasmonic nanostructure 850.

CONCLUSION

In conclusion, a solid-state thin film device uses moisture in the surrounding environment for electrochemically switching the refractive index of an active electrolyte layer. Both reflection and transmission can be controlled using the electrochemical switching mechanism. For example, color from a thin-film interference device can be controlled by voltage application in a non-volatile and reversible manner.

By using ambient moisture, the device can operate without an ion storage layer and the active oxide can be made as thin as several nanometers so that control of the optical properties can be highly localized. In addition, the ultra-thin solid-state stack allows the use of flexible substrates. And making the bottom electrode out of a hydrogen-absorbing metal layer further increases the modulation range. The versatile system has great potential to be applied in plasmonic devices and active metamaterials to achieve control of optical properties at nanoscales, including in tunable filters, sensors, and displays.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize or be able to ascertain, using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunctio n with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of" "only one of" or "exactly one of" "Consisting essentially of" when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving" "holding," "composed of" and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. A device comprising:
   a first electrode;
   a second electrode;
   a solid electrolyte disposed between the first electrode and the second electrode; and
   a voltage source, in electrical communication with the first electrode and the second electrode, to apply a voltage across the first electrode and the second electrode, the voltage splitting water into oxygen and protons at an interface between the first electrode and the solid electrolyte, the voltage generating an electric field that drives the protons toward the second electrode, the protons causing a change in an optical property of the solid electrolyte.

2. The device of claim 1, wherein the first electrode is permeable enough to pass the water to the interface between the first electrode and the solid electrolyte.

3. The device of claim 1, wherein the first electrode comprises a conductive nanostructure and wherein the change in the optical property of the solid electrolyte shifts a wavelength of a plasmonic resonance of the conductive nanostructure.

4. The device of claim 1, wherein the solid electrolyte comprises a rare earth oxide $RE_2O_{3-\delta}$, where RE is at least one of La, Pr, Nd, Sm, Eu, Gd, Tb, Ho, Yb, or Y and $\delta$ is between 0.01 and 0.5.

5. The device of claim 1, wherein the solid electrolyte has a thickness of about 4 nm to about 80 nm.

6. The device of claim 1, wherein the solid electrolyte has a proton conductivity of about $10^{-11}$ siemens/meter to about $10^{-7}$ siemens/meter at room temperature.

7. The device of claim 1, wherein the change in the optical property of the solid electrolyte occurs in less than about 100 seconds.

8. The device of claim 1, wherein the second electrode comprises at least one of magnesium, yttrium, lanthanum, or an alloy thereof, the protons causing the second electrode to change from a reflective state to a dielectric state.

9. The device of claim 1, further comprising:
   a water storage layer, disposed on the first electrode, to provide the water via the first electrode.

10. The device of claim 1, further comprising:
    a substrate; and
    a dielectric layer disposed between the substrate and the second electrode and having a refractive index different than a refractive index of the solid electrolyte.

11. The device of claim 1, further comprising:
    a plasmonic nanostructure formed in or next to the solid electrolyte, the change in the optical property of the solid electrolyte shifting a wavelength of a plasmonic resonance of the plasmonic nanostructure.

12. The device of claim 11, further comprising:
    a metal layer disposed over at least a portion of the plasmonic nanostructure.

13. The device of claim 11, wherein the protons cause the second electrode to change from a conductive reflective state to a dielectric transparent state.

14. The device of claim 11, wherein the protons cause a change in an optical property of the plasmonic nanostructure.

15. A method comprising:
    applying an electric field across a solid electrolyte with a first electrode and a second electrode, the electric field splitting water into oxygen ions and protons at an interface between the first electrode and the solid electrolyte, the electric field driving the protons toward the second electrode, the protons causing a change in an optical property of the solid electrolyte.

16. The method of claim 15, further comprising:
    absorbing the water from a surrounding atmosphere via the first electrode.

17. The method of claim 15, further comprising:
    absorbing the water from a water storage layer disposed on the first electrode.

18. The method of claim 15, wherein the change in the optical property of the solid electrolyte shifts a wavelength of a plasmonic resonance of a conductive nanostructure.

19. The method of claim 15, wherein the protons cause the second electrode to change from a reflective state to a dielectric state.

20. The method of claim 15, further comprising:
    detecting the change in the optical property of the solid electrolyte.

21. The method of claim 15, wherein the second electrode is disposed on a dielectric layer and the change in the optical property is a change in a refractive index of the solid electrolyte.

22. The method of claim 15, wherein the solid electrolyte contains a plasmonic nanostructure formed in the solid electrolyte and the change in the optical property of the solid electrolyte shifts a wavelength of a plasmonic resonance of the plasmonic nanostructure.

23. A device comprising:
    a layer of noble metal;
    a layer of magnesium;
    a layer of gadolinium oxide disposed between the layer of noble metal and the layer of magnesium; and
    a voltage source, in electrical communication with the layer of noble metal and the layer of magnesium, to apply an electric field across the gadolinium oxide, the electric field splitting water into oxygen ions and protons at an interface between the layer of noble metal and the gadolinium oxide, the electric field driving the protons toward the layer of magnesium, the protons changing the layer of magnesium from a reflective state to a non-reflective state.

* * * * *